(12) United States Patent
Benoit

(10) Patent No.: US 9,771,853 B2
(45) Date of Patent: Sep. 26, 2017

(54) WASTE HEAT ACCUMULATOR/DISTRIBUTOR SYSTEM

(75) Inventor: Ryan J. Benoit, Bowmanville (CA)

(73) Assignee: GM Global Technology Operations LLC, Detroit, MI (US)

(*) Notice: Subject to any disclaimer, the term of this patent is extended or adjusted under 35 U.S.C. 154(b) by 2291 days.

(21) Appl. No.: 12/715,494

(22) Filed: Mar. 2, 2010

(65) Prior Publication Data

US 2011/0214629 A1    Sep. 8, 2011

(51) Int. Cl.

| F01P 7/00 | (2006.01) |
|---|---|
| F01P 7/14 | (2006.01) |
| F01P 7/02 | (2006.01) |
| F01P 11/02 | (2006.01) |
| F02F 1/24 | (2006.01) |
| F01P 1/06 | (2006.01) |
| F28D 15/00 | (2006.01) |
| F01P 7/10 | (2006.01) |
| F01P 7/12 | (2006.01) |

(Continued)

(52) U.S. Cl.
CPC ...... *F01P 1/06* (2013.01); *F01P 7/16* (2013.01); *F28D 15/00* (2013.01); *B64D 33/08* (2013.01); *F01P 3/207* (2013.01); *F01P 7/023* (2013.01); *F01P 7/10* (2013.01); *F01P 7/12* (2013.01); *F01P 7/164* (2013.01); *F01P 7/165* (2013.01); *F01P 2007/146* (2013.01); *F01P 2025/32* (2013.01); *F01P 2050/04* (2013.01); *Y02E 60/145* (2013.01)

(58) Field of Classification Search
CPC ........ F01P 7/164; F01P 2025/32; F01P 7/023; F01P 7/12; F01P 7/10; F01P 7/16; F01P 2050/04; F01P 3/207; F01P 7/165; B64D 33/08; B64D 2700/62973
USPC ......... 123/41.09, 41.06, 41.02, 41.05, 41.08, 123/41.14, 41.82 R
See application file for complete search history.

(56) References Cited

U.S. PATENT DOCUMENTS 4,004,426 A * 1/1977 Laing ............................. 60/659
4,189,695 A * 2/1980 Hirahara ....................... 337/204
(Continued)

FOREIGN PATENT DOCUMENTS

| DE | 4104093 A1 | 8/1992 |
| JP | 2002137624 A | 5/2002 |
| JP | 2008175189 A | 7/2008 |

*Primary Examiner* — Jacob Amick
*Assistant Examiner* — Charles Brauch
(74) *Attorney, Agent, or Firm* — Quinn IP Law

(57) ABSTRACT

A waste heat accumulator/distributor system for use in a vehicle. The system includes an engine coolant loop directing engine coolant through a power plant, a powertrain electronics coolant loop directing electronics coolant through a powertrain electronics system; and a transmission fluid loop directing transmission fluid through a transmission. The system includes a multi-fluid heat exchanger including an engine coolant inlet receiving the engine coolant from the engine coolant loop, an electronics coolant inlet receiving the electronics coolant from the powertrain electronic coolant loop, and a transmission fluid inlet receiving the transmission fluid from the transmission fluid loop; a first valve controllable to cause engine coolant to flow into the engine coolant inlet or to bypass the engine coolant inlet; and a second valve controllable to cause electronics coolant to flow into the electronics coolant inlet or to bypass the electronics coolant inlet.

16 Claims, 3 Drawing Sheets

(51) Int. Cl.
    *F01P 3/20*    (2006.01)
    *B64D 33/08*   (2006.01)
    *F01P 7/16*    (2006.01)

(56) References Cited

U.S. PATENT DOCUMENTS

| | | | | |
|---|---|---|---|---|
| 4,317,439 | A * | 3/1982 | Emmerling | 123/563 |
| 4,982,895 | A * | 1/1991 | Shimizu et al. | 237/2 A |
| 5,036,803 | A * | 8/1991 | Nolting et al. | 123/41.1 |
| 5,215,044 | A * | 6/1993 | Banzhaf et al. | 123/41.29 |
| 5,647,221 | A * | 7/1997 | Garris, Jr. | 62/116 |
| 6,244,256 | B1 * | 6/2001 | Wall et al. | 123/568.12 |
| 6,338,145 | B1 * | 1/2002 | Yudenfriend et al. | 714/2 |
| 6,772,715 | B2 * | 8/2004 | Pfeffinger et al. | 123/41.31 |
| 6,789,512 | B2 * | 9/2004 | Duvinage et al. | 123/41.05 |
| 7,040,303 | B2 * | 5/2006 | Uzkan et al. | 123/563 |
| 7,267,086 | B2 * | 9/2007 | Allen et al. | 123/41.44 |
| 7,395,787 | B1 * | 7/2008 | Claypole et al. | 123/41.01 |
| 7,454,896 | B2 * | 11/2008 | Chalgren et al. | 60/278 |
| 7,649,273 | B2 * | 1/2010 | Zillmer et al. | 290/40 C |
| 7,721,543 | B2 * | 5/2010 | Massey et al. | 60/618 |
| 2002/0153125 | A1 * | 10/2002 | Marton | 165/41 |
| 2003/0127528 | A1 * | 7/2003 | Sabhapathy et al. | 237/12.3 B |
| 2004/0045749 | A1 * | 3/2004 | Jaura et al. | 180/65.2 |
| 2004/0194847 | A1 * | 10/2004 | Few | 141/65 |
| 2006/0223673 | A1 * | 10/2006 | Centlivre et al. | 477/181 |
| 2007/0186878 | A1 * | 8/2007 | Wantschik | 123/41.29 |
| 2008/0078542 | A1 * | 4/2008 | Gering et al. | 165/202 |
| 2009/0020081 | A1 * | 1/2009 | Claypole et al. | 123/41.31 |

* cited by examiner

WASTE HEAT ACCUMULATOR/DISTRIBUTOR SYSTEM

BACKGROUND OF INVENTION

The present invention relates generally to cooling systems for vehicle subsystems and more particularly to a waste heat accumulator/distributor system incorporated into vehicle cooling systems.

Traditionally, vehicles employing internal combustion engines and automatic transmissions have separate cooling systems for the two vehicle subsystems. In the case of hybrid electric and extended range electric vehicles, often a third separate cooling system for the powertrain electronics is also employed. These separate cooling systems take up a significant amount of packaging space and add weight with no benefit of synergies since the three cooling systems are separate.

SUMMARY OF INVENTION

An embodiment contemplates a waste heat accumulator/distributor system for use in a vehicle. The system may include an engine coolant loop directing engine coolant through a power plant, a powertrain electronics coolant loop directing electronics coolant through a powertrain electronics system; and a transmission fluid loop directing transmission fluid through a transmission. The system may also include a multi-fluid heat exchanger including an engine coolant inlet selectively receiving the engine coolant from the engine coolant loop, an electronics coolant inlet selectively receiving the electronics coolant from the powertrain electronic coolant loop, and a transmission fluid inlet selectively receiving the transmission fluid from the transmission fluid loop, whereby heat transfer between the engine coolant, the electronics coolant and the transmission fluid can occur in the multi-fluid heat exchanger; a first valve controllable to selectively cause the engine coolant to flow into the engine coolant inlet or to bypass the engine coolant inlet of the multi-fluid heat exchanger; and a second valve controllable to selectively cause the electronics coolant to flow into the electronics coolant inlet or to bypass the electronics coolant inlet of the multi-fluid heat exchanger.

An embodiment contemplates a method of operating a waste heat accumulator/distributor system in a vehicle, the method comprising the steps of: directing engine coolant through an engine in an engine coolant loop; directing electronics coolant through a powertrain electronics system in a powertrain electronics coolant loop; directing transmission fluid through a transmission in a transmission fluid loop; selectively directing the engine coolant through or bypassing a multi-fluid heat exchanger as the engine coolant flows through the engine coolant loop; selectively directing the electronics coolant through or bypassing the multi-fluid heat exchanger as the electronics coolant flows through the powertrain electronics coolant loop; and directing the transmission fluid through the multi-fluid heat exchanger as the transmission fluid flows through the transmission fluid loop.

An advantage of an embodiment is that the waste heat accumulator/distributor system can selectively capture waste heat from the engine, powertrain electronics or transmission and transfer that heat to systems that have a current need for the thermal energy or the capacity to absorb the waste heat being generated and dissipate it out of the systems. The heat absorption between the different cooling loops can be easily managed by employing two electronically controlled valves in two of the three cooling loops and a single multi-fluid heat exchanger. This system may allow for improved vehicle fuel economy, improved electric only range of a vehicle, improved HVAC system operation, and improved vehicle packaging. Moreover, the cost of the transmission cooling system may be reduced by eliminating the need for a separate transmission fluid cooler.

DETAILED DESCRIPTION

Figure 1:
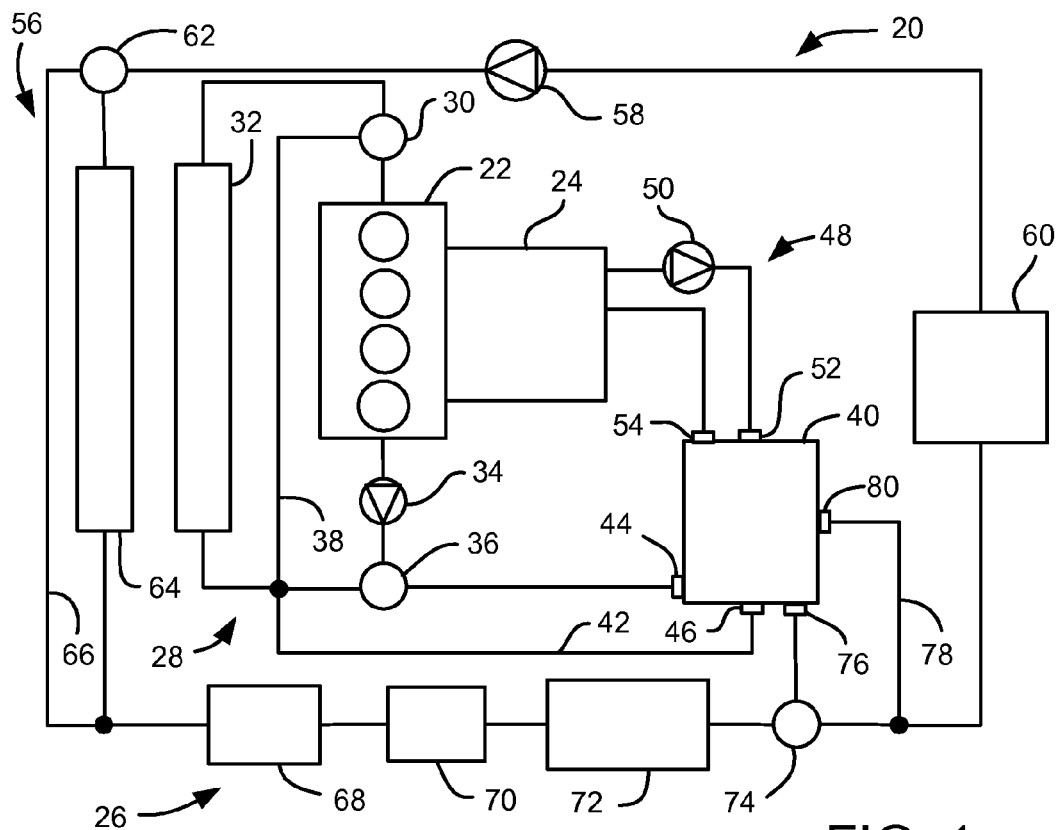
FIG. 1 is a schematic drawing of a waste heat accumulator/distributor system for use in a vehicle.

Referring to FIG. 1, a waste heat accumulator/distributor system 20 used in a vehicle is shown. The system 20 interacts with a power plant, such as, for example, an internal combustion engine 22, a transmission 24 and a powertrain electronics system 26. Such a system 20 may be employed in, for example, a hybrid electric or extended range electric vehicle.

The system 20 interfaces with the engine 22 via an engine coolant loop 28. The engine coolant loop 28 may include a thermostat 30, selectively directing engine coolant flow through or bypassing an engine radiator 32 based on the temperature of the engine coolant. The engine coolant loop also includes a water pump 34 for pumping the engine coolant through the loop 28. An electronically controlled valve 36 is in the engine coolant loop 28 and can be controlled to selectively direct the coolant flowing from the engine 22 toward the engine radiator 32 or radiator bypass line 38, or to direct the coolant flowing from the engine 22 toward an engine coolant inlet 44 to a multi-fluid heat exchanger 40. A return line 42 connects to an engine coolant outlet 46 on the heat exchanger 40 and directs the engine coolant back toward the engine radiator 32 and the radiator bypass line 38. Thus, the electronically controlled valve 36 can direct engine coolant to flow through or to bypass the multi-fluid heat exchanger 40.

The system 20 interfaces with the transmission 24 via a transmission fluid loop 48. The transmission fluid loop 48 may include a transmission fluid pump 50 that pumps a transmission fluid through the loop 48. Fluid flowing from the transmission 24 is received by a transmission fluid inlet 52 to the multi-fluid heat exchanger 40, and flows from a transmission fluid outlet 54 from the heat exchanger 40 back to the transmission 24.

The system 20 interfaces with the powertrain electronics system 26 via a powertrain electronics coolant loop 56. The loop 56 may include an electronics coolant pump 58 that pumps electronics coolant through the loop 56. Electronics coolant flowing from a passenger cabin heating loop 60 may flow through the pump 56 to an electronically controlled valve 62. The valve 62 can be controlled to selectively direct the coolant flowing from the passenger cabin heating loop 60 toward a powertrain electronics radiator 64 or an electronics radiator bypass line 66. The powertrain electronics system 26 may include, for example, an on-board charging module 68, an accessory power inverter module 70, and a traction power inverter module 72, through which the electronics coolant flows. A second electronically controlled valve 74 in the powertrain electronics coolant loop 56 can be controlled to selectively direct the electronics coolant flowing from the powertrain electronics system 26 toward an electronics coolant inlet 76 to the multi-fluid heat exchanger 40 or to the passenger cabin heating loop 60. A return line 78 connects an electronics coolant outlet 80 on the heat exchanger 40 and directs the electronics coolant toward the passenger cabin heating loop 60. The cabin heating loop 60 is optional and does not have to be connected to the powertrain electronics coolant loop 56 since cabin heating can be accomplished in other ways.

Various temperature sensors (not shown) may be employed to determine the temperature of the fluids in the various cooling loops and other vehicle components. These temperature sensors are known to those skilled in the art and so will not be discussed in detail herein.

Figure 2:
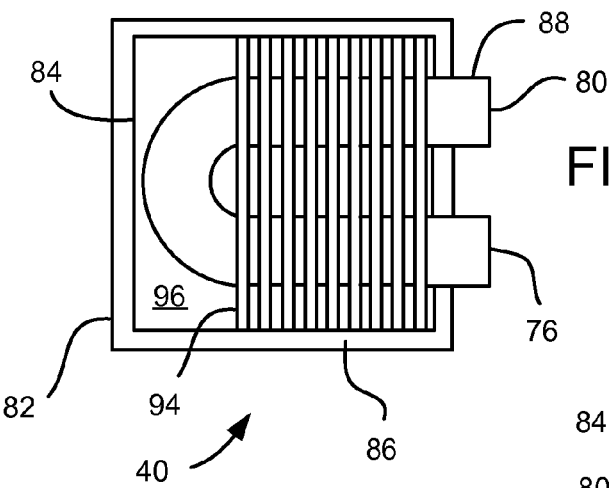
FIG. 2 is a schematic drawing of a multi-fluid heat exchanger for use in the waste heat accumulator/distributor system.
Figure 3:
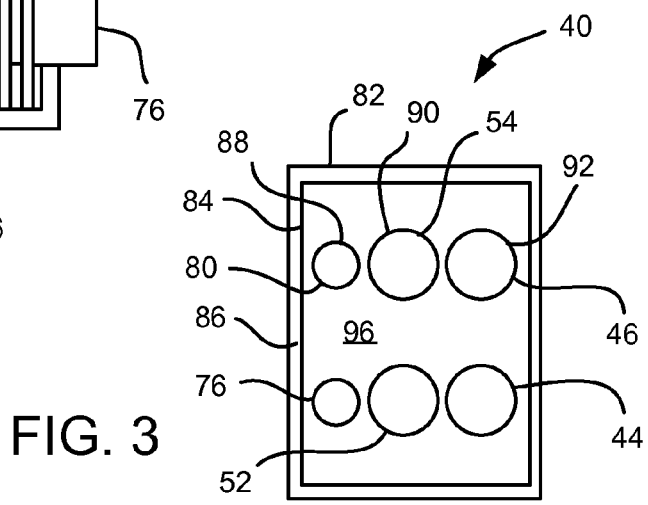
FIG. 3 is a schematic drawing of the multi-fluid heat exchanger similar to FIG. 2, but viewing it from a different direction.

FIGS. 2 and 3 illustrate a multi-fluid heat exchanger 40 that may be employed with the waste heat accumulator/distributor system 20 of FIG. 1. The heat exchanger 40 may include an outer housing 82 separated from an inner housing 84 by a layer of insulation 86. The heat exchanger 40 may include tubes 88, 90, 92 that direct the electronics coolant, transmission fluid and engine coolant, respectively, through the heat exchanger 40. The tubes 88, 90, 92 include respective inlets 76, 52, 44, and outlets 80, 54 and 46. Fins 94 may be employed to increase heat transfer between the tubes 88, 90, 92. The transmission fluid tube 90 may be located between the electronics coolant tube 88 and the engine coolant tube 92 in order to better allow for heat transfer into and out of the transmission fluid to the other two coolants.

The remaining space 96 in the inner housing 84 may be filled with just air. Alternatively, the remaining space 96 may be filled with a phase change material. Non-limiting examples of the phase change material include barium hydroxide $(Ba(OH)_2\text{-}8H_2O)$ or Glauber's salt $(Na_2SO_4\text{-}10H_2O)$. The phase change material creates a thermal storage capability for the heat exchanger 40. By using the phase change material, excess waste heat can be stored in the phase change material during peak heat load conditions to reduce loop temperatures during these peak conditions, which heat will then dissipate over a longer time period. This may also allow for the elimination of auxiliary cabin heating devices.

The conventional approach of having multiple cooling systems managed independently and isolated from one another does not address the fact that in alternative propulsion applications there are several cases where one system requires cooling while another requires heating simultaneously. This conventional approach also does not consider cases where one system may require a significant amount of cooling capacity while another has additional capacity available, and having the ability to transfer this heat from one loop to the other would minimize the stress on each of the systems. With the multi-fluid heat exchanger 40 having inlets 44, 52, 76 and outlets 46, 54, 80 for engine coolant, transmission fluid and electronics coolant, respectively, and with the electronic control valves 36, 74, the heat transfer between the various coolants/fluids can be controlled to improve overall vehicle performance. This allows for at least four different operating modes for coolant/fluid flow in the waste heat accumulator/distributor system 20, which will be discussed below with reference to FIGS. 4-7. The arrows indicate the direction of flow of the fluids in the loops 28, 48, 56.

Figure 4:
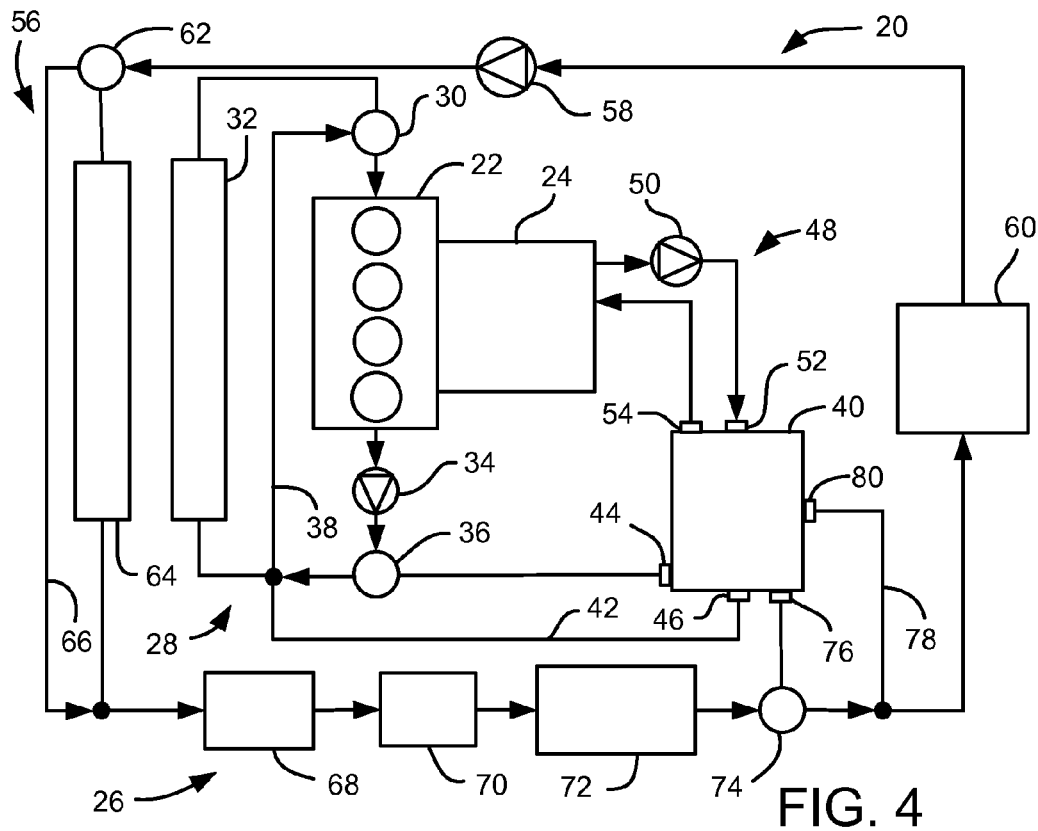
FIG. 4 is a schematic drawing similar to FIG. 1, illustrating a first mode of operation.

FIG. 4 is a schematic view similar to FIG. 1, illustrating a first mode of operation. In this mode the valve 36 is actuated to cause the engine coolant to bypass the multi-fluid heat exchanger 40. Depending upon the activation of the thermostat 30, the engine coolant may flow through the engine radiator 32 as shown, or it may flow through the radiator bypass line 38 instead. The valve 74 is actuated to cause the electronics coolant to bypass the multi-fluid heat exchanger 40. Depending upon the position of the valve 62, the electronics coolant may flow through the powertrain electronics radiator 64 as shown, or it may flow through the electronics radiator bypass line 66 instead. The transmission fluid is directed from the transmission 24 through the multi-fluid heat exchanger 40 and back to the transmission 24. In this first mode of operation, then, while the transmission fluid is flowing through the heat exchanger 40, neither the engine coolant nor the electronics coolant flows through the heat exchanger 40 and so they are both thermally isolated from the transmission fluid.

This mode is preferably employed, for example, when the transmission 24 is operating within its desired temperature range, or, for example, when the transmission is operating below its desired temperature range but above the engine coolant temperature and the electronics coolant temperature.

Figure 5:
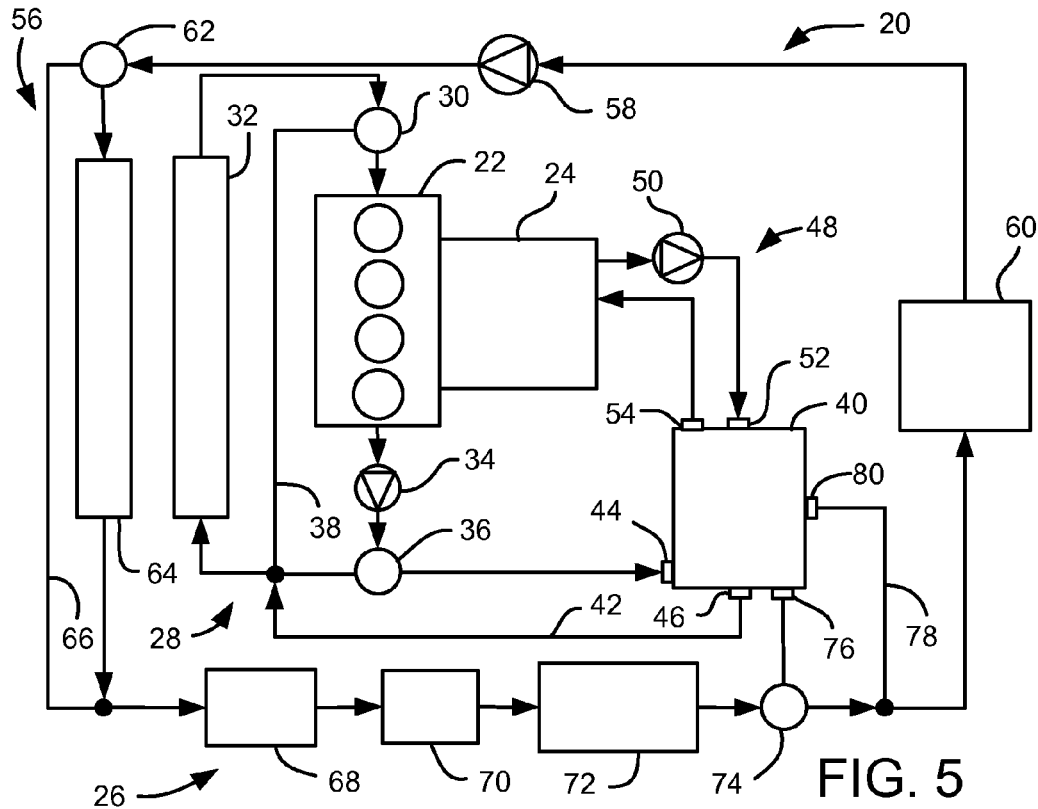
FIG. 5 is a schematic drawing similar to FIG. 1, illustrating a second mode of operation.

FIG. 5 is a schematic view similar to FIG. 1, but illustrating a second mode of operation. In this mode, the valve 36 is actuated to cause the engine coolant to flow from the engine 22 and through the multi-fluid heat exchanger 40 before flowing through the engine radiator 32. Depending upon the activation of the thermostat 30, the engine coolant may flow through the engine radiator 32 as shown, or it may flow through the radiator bypass line 38 instead. The valve 74 is actuated to cause the electronics coolant to bypass the multi-fluid heat exchanger 40. Depending upon the position of the valve 62, the electronics coolant may flow through the powertrain electronics radiator 64 as shown, or it may flow through the electronics radiator bypass line 66 instead. The transmission fluid is directed from the transmission 24 through the heat exchanger 40 and back to the transmission 24. In this second mode of operation, then, both the transmission fluid and the engine coolant flow through the heat exchanger 40, while the electronics coolant flow bypasses the heat exchanger 40. Thus, heat transfer between the engine coolant and the transmission fluid occurs.

This mode is preferably employed, for example, when the engine 22 is on, the transmission 24 is operating below its desired temperature range and the transmission fluid temperature is lower than the engine coolant temperature, thus allowing heat to transfer from the engine coolant to the transmission fluid. This mode may also be employed, for example, when the transmission 24 is operating near or above the top of its desired temperature range and the engine 22 is off. In this second example, the water pump 34 is one that can be electrically driven rather than driven solely by the engine, and the pump 34 is activated in order to keep the engine coolant circulating through the engine coolant loop 28. In this case, the engine coolant absorbs heat from the transmission fluid and the heat is dissipated when the engine coolant flows through the engine radiator 32. In another example, the transmission 24 is operating near or above the top of its desired temperature range and the engine 22 is on. Again heat is transferred from the transmission fluid to the engine coolant. This operating state is desirable when the engine coolant loop 28 can manage the combination of both the transmission 24 and engine 22 thermal loads through the engine radiator 32.

Figure 6:
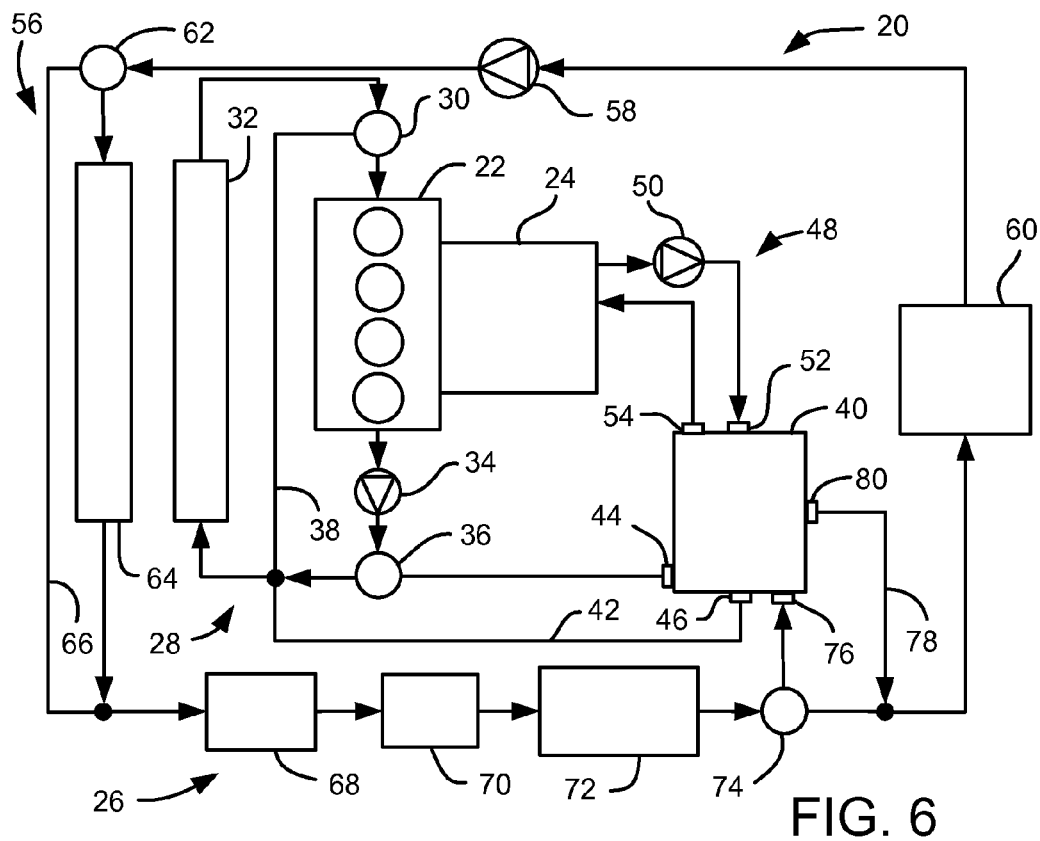
FIG. 6 is a schematic drawing similar to FIG. 1, illustrating a third mode of operation.

FIG. 6 is a schematic view similar to FIG. 1, but illustrating a third mode of operation. In this mode, the valve 36 is actuated to cause the engine coolant to bypass the multi-fluid heat exchanger 40. Depending upon the activation of the thermostat 30, the engine coolant may flow through the engine radiator 32 as shown, or it may flow through the radiator bypass line 38 instead. The valve 74 is actuated to cause the electronics coolant to flow through the multi-fluid heat exchanger 40. Depending upon the position of the valve 62, the electronics coolant may flow through the powertrain electronics radiator 64 as shown, or it may flow through the electronics radiator bypass line 66 instead. The transmission fluid is directed from the transmission 24 through the heat exchanger 40 and back to the transmission 24. In this third mode of operation, then, both the transmission fluid and the electronics coolant flow through the heat exchanger 40, while the engine coolant flow bypasses the heat exchanger 40. Thus, heat transfer between the electronics coolant and the transmission fluid occurs.

This mode is preferably employed, for example, when the powertrain electronics system 26 is operating, the transmission 24 is operating below its desired temperature range and the transmission fluid temperature is lower than the electronics coolant temperature, thus allowing heat to transfer from the electronics coolant to the transmission fluid. In another example, the transmission 24 is operating near or above the top of its desired temperature range and the powertrain electronics system 26 is operating. Heat is transferred from the transmission fluid to the electronics coolant. This operating state is desirable when the electronics coolant loop 56 can manage the combination of both the transmission 24 and powertrain electronics 26 thermal loads through the powertrain electronics radiator 64.

Figure 7:
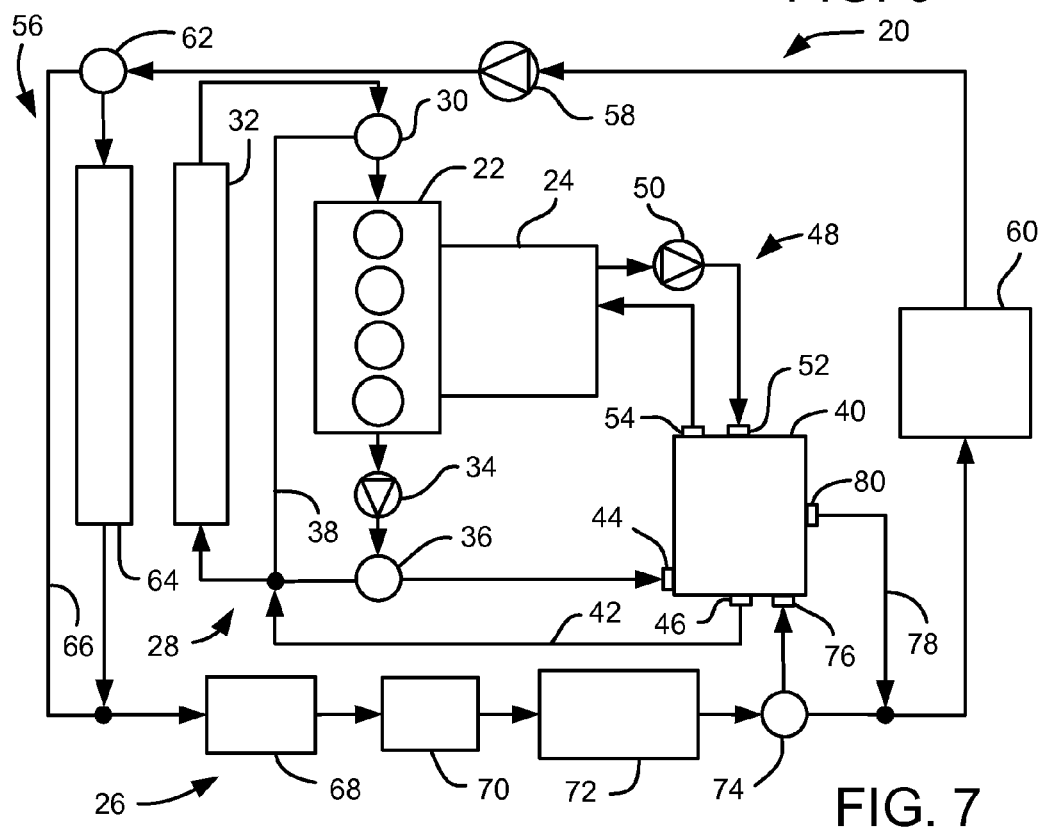
FIG. 7 is a schematic drawing similar to FIG. 1, illustrating a fourth mode of operation.

FIG. 7 is a schematic view similar to FIG. 1, but illustrating a fourth mode of operation. In this mode, the valve 36 is actuated to cause the engine coolant to flow from the engine 22 and through the multi-fluid heat exchanger 40 before flowing through the engine radiator 32. The valve 74 is actuated to cause the electronics coolant to flow through the multi-fluid heat exchanger 40 before flowing through the passenger cabin heating loop 60. The transmission fluid is directed from the transmission 24 through the heat exchanger 40 and back to the transmission 24. In this third mode of operation, then, the transmission fluid, the electronics coolant and the engine coolant flow through the heat exchanger 40.

This mode is preferably employed, for example, when the engine 22 and the transmission 24 are operating within or above their respective desired temperature ranges and additional engine or transmission cooling capacity is desired. This mode allows the electronics coolant to absorb heat from the engine coolant and the transmission fluid. In a similar situation, if the transmission 24 is operating near or above the upper limit of its desired temperature range and the engine coolant loop 28 cannot dissipate heat for both loops 28, 48 fast enough, then the powertrain electronics coolant loop 56 can absorb some of the heat and dissipate it through the powertrain electronics radiator 64. This mode may also be employed, for example, when the engine 22 and the transmission 24 are operating within or above their respective desired temperature ranges and additional cabin heating (for systems where the passenger cabin heating loop 60 interfaces with the electronics coolant loop 56) is desired. The electronics coolant will then absorb heat from the engine coolant and/or the transmission fluid, with the heat now being available to the passenger cabin heating loop 60.

While certain embodiments of the present invention have been described in detail, those familiar with the art to which this invention relates will recognize various alternative designs and embodiments for practicing the invention as defined by the following claims.

What is claimed is:

1. A waste heat accumulator/distributor system for use in a vehicle comprising:
   an engine coolant loop configured to direct engine coolant through a power plant;
   a powertrain electronics coolant loop configured to direct electronics coolant through a powertrain electronics system;
   a transmission fluid loop configured to direct transmission fluid through a transmission;
   a multi-fluid heat exchanger including an engine coolant inlet configured to selectively receive the engine coolant from the engine coolant loop, an electronics coolant inlet configured to selectively receive the electronics coolant from the powertrain electronic coolant loop, and a transmission fluid inlet configured to selectively receive the transmission fluid from the transmission fluid loop, whereby heat transfer between the engine coolant, the electronics coolant and the transmission fluid can occur in the multi-fluid heat exchanger;
   a first valve controllable to selectively cause the engine coolant to flow into the engine coolant inlet or to bypass the engine coolant inlet of the multi-fluid heat exchanger; and
   a second valve controllable to selectively cause the electronics coolant to flow into the electronics coolant inlet or to bypass the electronics coolant inlet of the multi-fluid heat exchanger.

2. The waste heat accumulator/distributor system of claim 1 including a passenger cabin heating loop, and wherein the multi-fluid heat exchanger includes an electronics coolant outlet, and the electronics coolant outlet and the second valve selectively direct the electronics coolant to the passenger cabin heating loop.

3. The waste heat accumulator/distributor system of claim 1 wherein the engine coolant loop includes a thermostat valve, an engine radiator and a radiator bypass line, the multi-fluid heat exchanger includes an engine coolant outlet, and the thermostat valve is actuatable such that the engine coolant outlet selectively directs the engine coolant through the engine radiator or the radiator bypass line.

4. The waste heat accumulator/distributor system of claim 1 wherein the powertrain electronics coolant loop includes a controllable valve, a powertrain electronics radiator and a radiator bypass line, the multi-fluid heat exchanger includes an electronics coolant outlet, and the controllable valve is actuatable such that the electronics coolant outlet selectively directs the electronics coolant through the powertrain electronics radiator or the bypass line.

5. The waste heat accumulator/distributor system of claim 1 wherein the multi-fluid heat exchanger includes an outer housing, an inner housing spaced from and located within the outer housing, and insulation located between the outer housing and the inner housing.

6. The waste heat accumulator/distributor system of claim 1 wherein the multi-fluid heat exchanger includes an engine coolant tube configured to direct the engine coolant therethrough, an electronics coolant tube configured to direct the electronics coolant therethrough, a transmission fluid tube configured to direct the transmission fluid therethrough, a housing surrounding the engine coolant tube, the electronics coolant tube and the transmission fluid tube, and a void between the housing and the tubes, the void being filled with air.

7. The waste heat accumulator/distributor system of claim 1 wherein the multi-fluid heat exchanger includes an engine coolant tube configured to direct the engine coolant therethrough, an electronics coolant tube configured to direct the electronics coolant therethrough, a transmission fluid tube configured to direct the transmission fluid therethrough, a housing surrounding the engine coolant tube, the electronics coolant tube and the transmission fluid tube, and a void between the housing and the tubes, the void being filled with a phase change material.

8. The waste heat accumulator/distributor system of claim 7 wherein the phase change material is at least one of barium hydroxide and Glauber's salt.

9. The waste heat accumulator/distributor system of claim 1 wherein the multi-fluid heat exchanger includes an engine coolant tube configured to direct the engine coolant therethrough, an electronics coolant tube configured to direct the electronics coolant therethrough, a transmission fluid tube configured to direct the transmission fluid therethrough, the transmission fluid tube being located between the engine coolant tube and the electronics coolant tube.

10. The waste heat accumulator/distributor system of claim 1 wherein the power plant is an internal combustion engine through which the engine coolant flows.

11. The waste heat accumulator/distributor system of claim 1 wherein the powertrain electronics system includes at least one of an on-board charging module, a power inverter module and a traction power inverter module through which the electronics coolant flows.

12. A method of operating a waste heat accumulator/distributor system in a vehicle, the method comprising the steps of:

(a) directing engine coolant through an engine in an engine coolant loop;
(b) directing electronics coolant through a powertrain electronics system in a powertrain electronics coolant loop;
(c) directing transmission fluid through a transmission in a transmission fluid loop;
(d) selectively directing the engine coolant through or bypassing a multi-fluid heat exchanger as the engine coolant flows through the engine coolant loop;
(e) selectively directing the electronics coolant through or bypassing the multi-fluid heat exchanger as the electronics coolant flows through the powertrain electronics coolant loop; and
(f) directing the transmission fluid through the multi-fluid heat exchanger as the transmission fluid flows through the transmission fluid loop.

13. The method of claim 12 wherein step (d) is further defined by actuating a first valve to direct the engine coolant through the multi-fluid heat exchanger or to bypass the multi-fluid heat exchanger.

14. The method of claim 13 wherein step (e) is further defined by actuating a second valve to direct the electronics coolant through the multi-fluid heat exchanger or to bypass the multi-fluid heat exchanger.

15. The method of claim 12 including step (g), directing the electronics coolant flowing through the powertrain electronics coolant loop to flow through a passenger cabin heating loop.

16. The method of claim 12 including step (g), providing a phase change material in the multi-fluid heat exchanger and storing heat energy in the phase change material.

\* \* \* \* \*